(No Model.) 2 Sheets—Sheet 1.

A. C. STILSON.
AXLE BEARING.

No. 567,697. Patented Sept. 15, 1896.

WITNESSES:

INVENTOR
Amos C. Stilson
BY Ben R. Hagar
ATTORNEY.

(No Model.) 2 Sheets—Sheet 2.
A. C. STILSON.
AXLE BEARING.
No. 567,697. Patented Sept. 15, 1896.
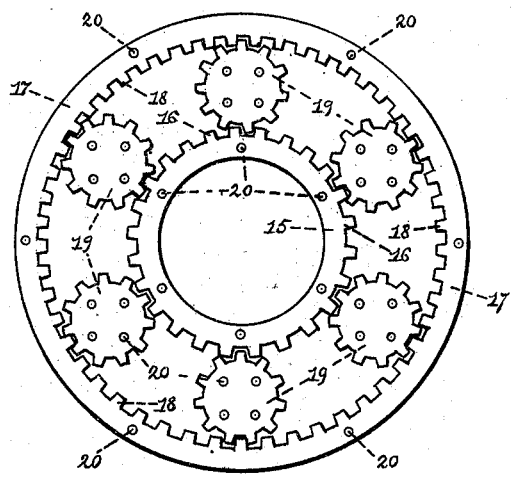
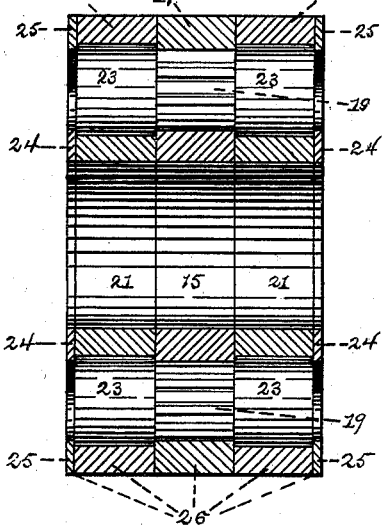
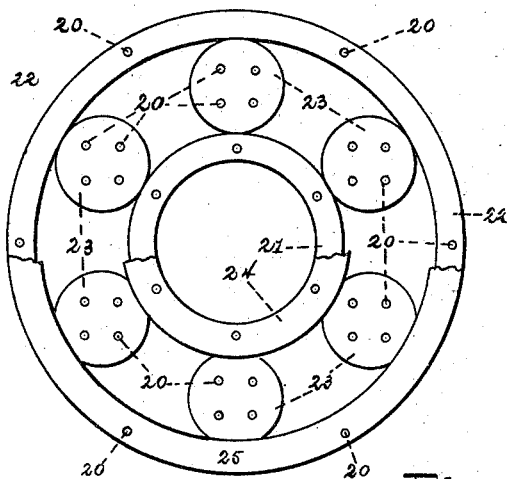
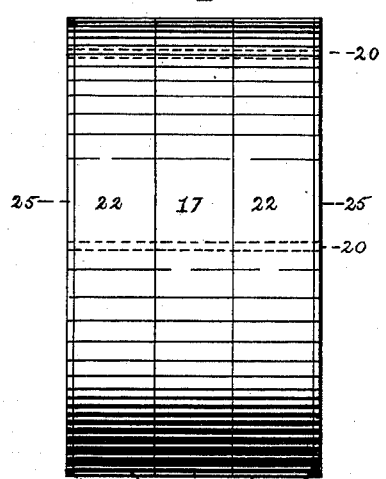
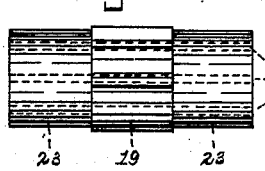
WITNESSES:
INVENTOR
Amos C. Stilson,
BY
ATTORNEY.

UNITED STATES PATENT OFFICE.

AMOS C. STILSON, OF BRADFORD, PENNSYLVANIA.

AXLE-BEARING.

SPECIFICATION forming part of Letters Patent No. 567,697, dated September 15, 1896.

Application filed October 9, 1895. Serial No. 565,162. (No model.)

*To all whom it may concern:*

Be it known that I, AMOS C. STILSON, a citizen of the United States, residing at Bradford, in the county of McKean and State of Pennsylvania, have invented a new and useful Improvement in Bicycle-Axle Bearings, of which the following is a specification.

Figure 1:
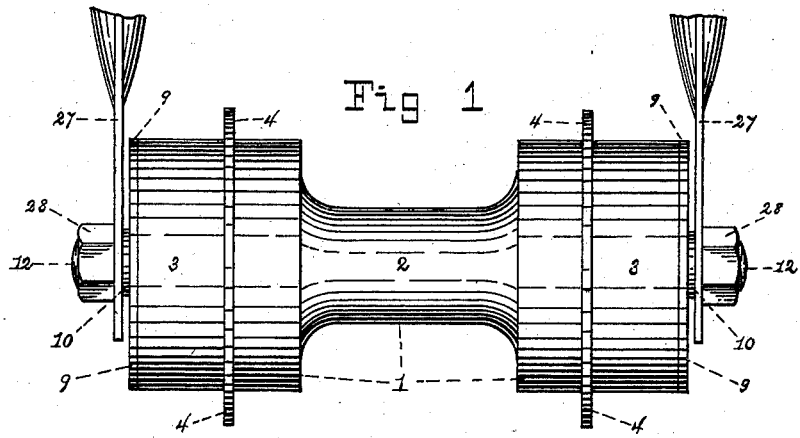
Figure 2:
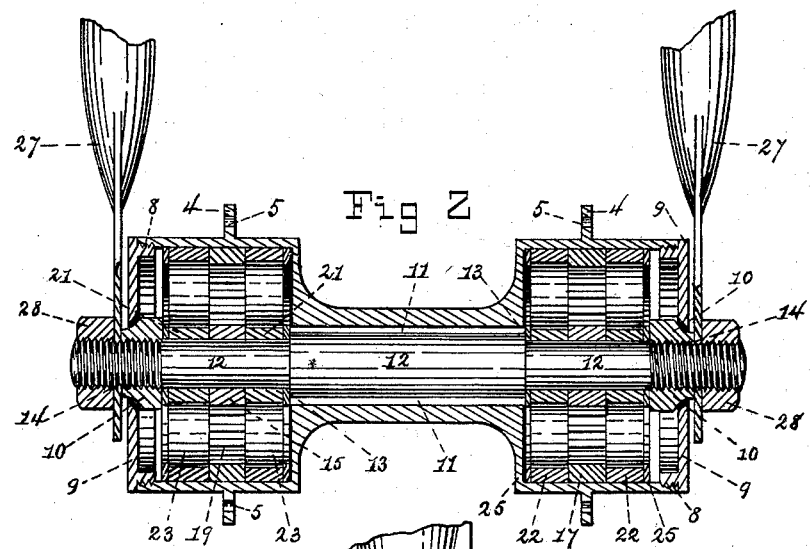
Figure 3:
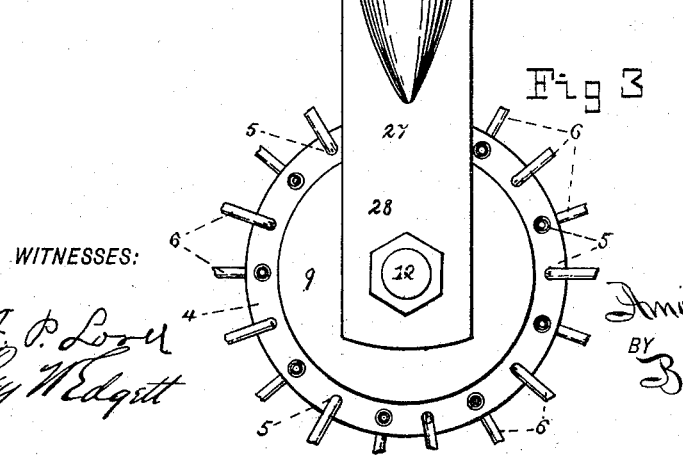

Figure 1 represents a side view of my hub with the lower portion of the prongs of the fork of a bicycle connected to it. Fig. 2 represents a longitudinal cross-section of Fig. 1. Fig. 3 represents an end view of my hub with the lower part of a prong of the fork connected to it. Fig. 4 represents an enlarged side elevation of the spur-gearing which is centrally located in my antifriction axle-bearing. Fig. 5 represents an enlarged axial cross-section view of my antifriction axle-bearing when the several parts are fastened together. Fig. 6 represents an enlarged side view of the rollers, track-rings, and a section of the flange-rings. Fig. 7 represents an enlarged side view of my antifriction axle-bearing, the dotted line representing rivets passing through the flange-rings, track-rings, and gear-rim. Fig. 8 represents a set of rollers and a pinion between them, all fastened together by rivets, which are represented by the dotted lines.

Similar numerals refer to similar parts throughout the several views.

In the drawings, numeral 1 is the hub, consisting of a hollow cylinder 2, provided at each end with cylindrical chambers 3, of a larger diameter than the hollow cylinder 2. The cylindrical chambers 3 are provided with the outside annular flanges 4, having the perforations 5, in which the spokes 6 are secured. They are further provided with the inner screw-threads 8, in which the caps 9 are screwed. The caps 9 are formed with a central orifice, through which the screw-threaded ends 14 of the axle 12 project.

11 is the passage-way through the hollow cylinder 2, connecting the chambers 3, and through which the axle 12 passes. The axle 12 is constructed with the middle portion of greater diameter than the ends, thereby forming the shoulders 13, the length of the middle portion of the axle 12 being of the same length as the passage-way 11, its diameter, however, being less than the passage-way 11, as shown in Fig. 2. The ends of the axle 12 are provided with the screw-threads 14. Within each of the cylindrical chambers 3 are placed the antifriction-bearings 26, consisting of the spur-gearing, as illustrated in Fig. 4, with a set of roller-bearings on each side of them. The spur-gearing consists of the ring 15, provided with the external teeth 16, and the rim 17, provided with the internal teeth 18, placed between the gear-ring 15 and the gear-rim 17. Spaced equal distances apart are the pinions 19, which mesh with the gear-ring 15 and the gear-rim 17. The gear-ring 15, the gear-rim 17, and the pinions 19 are provided with the rivet-holes 20. The roller-bearings, as illustrated in Fig. 6, consist of the small track-ring 21 and the large track-ring 22, between which are placed the rollers 23. 24 and 25 are flange-rings, for the purpose of preventing lateral movement of the rollers 23. The antifriction axle-bearing is constructed by riveting the track-rings 22 on each side of the gear-rim 17, the track-rings 21 on each side of the gear-ring 15, and the rollers 23 on each side of the pinions 19, also the flange-rings 24 and 25 on the outside of the track-rings 21 and 22, respectively, as shown in Figs. 5 and 7, all as indicated by numeral 26.

In the construction of the bicycle-axle bearing complete the axle 12 is inserted in the hub 1, the riveted antifriction-bearings 26 are placed on the ends of the axle 12, to which the track-rings 21 and the gear-rings 15 are closely but movably fitted. The shoulders 13 of the alxe 12 prevent the antifriction-bearing 26 from rubbing against the inner side of the cylindrical chambers 3. They are held movably in place by the nuts 10. The caps 9 are then screwed on. 27 are the lower portions of the fork of the bicycle-frame, secured on the axle 12 by means of the nuts 28. It will be observed by examining Fig. 4 that there is a play between the ends of the teeth of the pinions 19 and the gear-rim 17 and the gear-ring 15, so that the bearing is entirely on the rollers, and when in use the gear-rings 15 revolve around the axle 12, the rollers 23 revolve around the track-rings 21 and within the track-rings 22, and the track-rings 22 revolve with the hubs 1, thus in the revolution of the hubs the friction engendered is infinitesimal. It will be further noted that there is no oil-hole in the hub, and that the screw-threaded caps fitting closely around the screw-threaded ends 14 of the axle 12 make the cylindrical chambers 3 practically dust-proof.

In the Letters Patent No. 469,890, granted to me under date of March 1, 1892, I was allowed an antifriction-roller bearing of a similar principle, but in order to make it practical for use with bicycles I have been obliged to change the mechanism to that as described above and shown in the accompanying drawings; therefore—

What I claim as new, and desire to secure by Letters Patent, is—

1. In a bicycle-axle bearing, the combination of the cylindrical chambers of the hub and the roller-bearing, each of the latter consisting of the large track-rings having the large gear-rim provided with external teeth, placed between them, the rollers having the pinions inserted between them, the small track-rings having the small gear-ring provided with external teeth inserted between them and the flange-rings, all fastened together respectively and movably secured within said cylindrical chambers substantially as shown and described.

2. In a bicycle-axle bearing, the combination of the cylindrical chambers of the hub, the roller-bearing, each of the latter consisting of the large track-rings, having the large gear-rim provided with internal teeth placed between them, the rollers having the pinions inserted between them, the small track-rings having the small gear-ring provided with external teeth inserted between them, and the flange-rings, all respectively fastened together by means of rivets and movably secured within said cylindrical chambers, and the axle formed with the central portion of a larger diameter than the ends, and of a lesser diameter than the passage-way through the hollow cylinder, the ends of said axle being provided with screw-threads substantially as shown and described.

3. In a bicycle-axle bearing, the combination of the hub consisting of a hollow cylinder provided with a cylindrical chamber at each end of a larger diameter, said chambers being provided on their peripheries at their centers longitudinally, with annular flanges, said flanges being provided with perforations for the purpose of securing the inner ends of the wheel-spokes, the roller-bearings, each consisting of the large track-rings, having the large gear-rim provided with internal teeth placed between them, the rollers having the pinions inserted between them, the small track-rings having the small gear-ring provided with external teeth inserted between them, and the flange-rings, all respectively fastened together by rivets and movably secured within said cylindrical chambers by means of the screw-threaded caps, and the axle formed with the central portion of a larger diameter than the ends, and of a lesser diameter than the passage-way through the hollow cylinder, the ends of said axle being provided with screw-threads, and the nuts, all substantially as shown and described and for the purpose herein set forth.

AMOS C. STILSON.

Witnesses:
A. P. LOSEE,
ROY W. EDGETT.